(12) United States Patent
Miyoshi et al.

(10) Patent No.: US 6,522,103 B1
(45) Date of Patent: Feb. 18, 2003

(54) SODIUM-SULPHUR BATTERY SYSTEM AND DRIVING METHOD THEREOF

(75) Inventors: Tadahiko Miyoshi, Hitachi (JP); Manabu Madokoro, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 73 days.

(21) Appl. No.: 09/642,782

(22) Filed: Aug. 22, 2000

(51) Int. Cl.⁷ .................................................. H02J 7/00
(52) U.S. Cl. ..................................................... 320/136
(58) Field of Search .................... 307/64, 66; 429/104; 363/74, 98; 320/136

(56) References Cited

U.S. PATENT DOCUMENTS

| | | | |
|---|---|---|---|
| 5,500,561 A | * 3/1996 | Wilhelm | 307/64 |
| 5,712,795 A | * 1/1998 | Layman et al. | 700/297 |
| 5,788,004 A | * 8/1998 | Friedmann et al. | 180/65.2 |
| 5,923,100 A | * 7/1999 | Lukens et al. | 307/66 |
| 5,962,160 A | * 10/1999 | Oyama et al. | 429/104 |
| 6,370,050 B1 | * 4/2002 | Peng et al. | 363/98 |

FOREIGN PATENT DOCUMENTS

| JP | 5-121092 | 5/1993 |
|---|---|---|
| JP | 8-17464 | 1/1996 |

* cited by examiner

Primary Examiner—Edward H. Tso
Assistant Examiner—Pia Tibbits
(74) Attorney, Agent, or Firm—Mattingly, Stanger & Malur, P.C.

(57) ABSTRACT

There are provided a sodium-sulfur battery system suitable for shifting the peak of an electric power line, and a method of operating the sodium-sulfur battery system and an electric power line system using the sodium-sulfur battery system.

In a sodium-sulfur battery system comprising a battery module having a sodium-sulfur battery contained in a thermal insulation container, an amount of peak-shift of an electric power line, which can be performed by the battery module, is calculated using a daily load characteristic of the electric power line and a discharge characteristic of the battery module, and an allowable amount of heat generation in battery and an allowable amount of discharge, and discharge of the battery module is controlled using the calculated result.

The peak-shift of an electric power line can be effectively performed without deteriorating the reliability of the sodium-sulfur battery, and the efficiencies of the sodium-sulfur battery system and an electric power line system using the sodium-sulfur battery system can be kept high.

8 Claims, 3 Drawing Sheets

SODIUM-SULPHUR BATTERY SYSTEM AND DRIVING METHOD THEREOF

BACKGROUND OF THE INVENTION

The present invention relates to an electric power storage system used for flattening the load of an electric power line and shifting the peak of the electric power line and, more particularly a sodium-sulfur battery system and a method of operating the sodium sulfur battery system and an electric power line system using the sodium-sulfur battery system.

The sodium-sulfur batteries using sodium for the negative electrode and sulfur the positive electrode have been received attention because of its large efficiency and its large energy density, and accordingly are expected to be used for an electric power storage system or for an electric vehicle. The sodium-sulfur batteries are contained in a thermal insulation container in order to maintain the operating temperature to 300 to 350° C. to form a battery module, and the battery module is operated by being combined with an AC/DC converter unit which converts a direct current to an alternating current and also converts an alternating current to a direct current.

Such a battery module is usually used in order to flatten the load, and is repetitively and cyclically operated with charging electric power during nighttime and discharging the electric power at a constant rate during daytime.

Therefore, in taking into consideration the heat generation during discharging the electric power at the constant rate, the thermal insulation container has been designed so that the temperature of the battery does not exceed an allowable temperature. However, in a case where the battery modules are used for peak-shift in the electric power line system, the load pattern required by the electric power line differs depending on season, weather and so on. Therefore, in the case of discharging the electric power by coping with the pattern, there have been problems that the battery temperature exceeds the required upper limit temperature to deteriorate the reliability of the battery when the discharging current is large, and that the electric energy stored in the battery can not sufficiently used in the peak-shift when the discharging current is small. Particularly, there has been a problem that corrosion of the positive-polar container containing sulfur and sodium polysulfide is progressed to reduce the battery capacity and to reduce the efficiency when the battery temperature exceeds the required upper limit temperature.

In order to cope with the above-mentioned problems, Japanese Patent Application Laid-Open No.5-121092 and Japanese Patent Application Laid-Open No.8-17464 propose a method that the heat dissipating characteristic of the thermal insulation container is varied so as to keep the battery temperature within the required temperature range. However, this method has a new problem that the structure of the thermal insulation container becomes complex and the thermal insulation container becomes large in size and accordingly the reliability is deteriorated. If the thermal insulation container is designed based on a larger amount of heat dissipation by taking various kinds of discharge patterns into consideration, it is possible that the battery temperature does not exceed the required upper limit temperature during discharging. However, in that case, it is required to input a larger amount of energy into the heater provided in the thermal insulation container in order to keep the battery temperature within the required temperature range during charging and during standing-by, which causes a problem that the efficiency of the sodium-sulfur battery system is reduced.

SUMMARY OF THE INVENTION

An object of the present invention is to provide a sodium-sulfur battery system suitable for shifting the peak of an electric power line or a load, and a method of operating the sodium-sulfur battery system and an electric power line system using the sodium-sulfur battery system.

In order to attain the above object, the sodium-sulfur battery system in accordance with the present invention is composed of, at least, a battery module having a sodium-sulfur battery contained in a thermal insulation container; an AC/DC converter unit; a calculation means for calculating an amount of peak-shift of an electric power line or the load so that an amount of heat generation in battery and/or an amount of discharge of the battery module do not exceed an allowable amount of heat generation and/or an allowable amount of discharge of the battery module; and a control means for controlling discharge of the battery module based on the calculated result of the amount of peak-shift. It is preferable that the calculation means comprises a means for tentatively determining the amount of peak-shift; a means for calculating a value of discharge current of the battery module using a daily load characteristic of the electric power line or the load and a discharge characteristic of the battery module and the tentatively determined amount of peak-shift; a means for calculating an amount of heat generation in battery and/or an amount of discharge of the battery module; a means for comparing the calculated value of the amount of heat generation in battery with the allowable amount of heat generation in battery and/or the calculated value of the amount of discharge with the allowable amount of discharge; and a means for correcting the tentatively determined amount of peak-shift when the calculated values of the amount of heat generation in battery and/or the amount of discharge are larger than the allowable amount of heat generation in battery and/or the allowable amount of discharge, respectively, or when the calculated values of the amount of heat generation in battery and/or the amount of discharge are largely less than the allowable amount of heat generation in battery and/or the allowable amount of discharge, respectively. It is also preferable that the calculation means comprises a means for calculating the value of discharge current and the amount of discharge every time step during discharging the battery module and repeating the calculation until a discharge completion time determined by the tentatively determined amount of peak-shift elapses; and a means for feeding back the calculated value of the amount of discharge to the calculation of the value of discharge current. Further, the calculation means may comprise a means for functionally approximating the daily load characteristic of the electric power line or the load. Furthermore, the calculation means may comprise a means for capturing the heat dissipation characteristic of the battery module and/or temperature dependence of than the discharge characteristic of the battery module.

Further, in the sodium-sulfur battery system in accordance with the present invention, it is preferable that the calculation means comprises a means for calculating a value of discharge current of the battery module at each time point using the calculated result of the amount of peak-shift, and the control means comprises a means for controlling discharge of the battery module according to the amount of the discharge current, or that the calculation means comprises a means for determining a reference electric power level using the calculated result of the amount of peak-shift, and the control means comprises a means for controlling discharge of the battery module following to a load electric power exceeding the reference electric power level. Further, in the case of the latter, the sodium-sulfur battery system in accordance with the present invention may comprise a means for measuring the temperature of the sodium-sulfur battery or/and the amount of discharge of the battery module; a means for comparing the measured temperature or/and the measured amount of discharge with the allowable temperature of the sodium-sulfur battery or/and the allowable amount of discharge of the battery module, respectively; and a means for stopping discharge of the battery module when the measured temperature or/and the measured amount of discharge reaches the allowable temperature of the sodium-sulfur battery or/and the allowable amount of discharge, respectively, or when the measured temperature or/and the measured amount of discharge becomes larger than the allowable temperature of the sodium-sulfur battery or/and the allowable amount of discharge, respectively.

Further, a sodium-sulfur battery system in accordance with the present invention comprises a battery module having a sodium-sulfur battery contained in a thermal insulation container; an AC/DC converter unit; and a control means for controlling discharge of the battery module, wherein a maximum output power of the AC/DC converter unit is equal to or larger than an amount of peak-shift of the electric power line which is determined using a daily load characteristic of the electric power line or the load and a discharge characteristic of the battery module so that an amount of heat generation in battery or/and an amount of discharge of the battery module does not exceed the allowable amount of heat generation in battery or/and the allowable amount of discharge of the battery module.

The electric power line system in accordance with the present invention is an electric power line system using the sodium-sulfur battery system described above.

On the other hand, according to the present invention, in a method of operating a sodium-sulfur battery system comprising a battery module having a sodium-sulfur battery contained in a thermal insulation container, the method comprises the steps of calculating an amount of peak-shift of an electric power line or a load using a daily load characteristic of the electric power line or the load and a discharge characteristic of the battery module so that an amount of heat generation in battery and/or an amount of discharge of the battery module do not exceed an allowable amount of heat generation in battery and/or an allowable amount of discharge of the battery module, respectively; and controlling discharge of the battery module using the calculated result of the amount of peak-shift obtained in the calculation step. It is preferable that the calculation of the amount of peak-shift comprises the steps of tentatively determining the amount of peak-shift; calculating a value of discharge current of the battery module using the daily load characteristic of the electric power line or the load and the discharge characteristic of the battery module and the tentatively determined amount of peak-shift; calculating the amount of heat generation in battery and/or the amount of discharge of the battery module using the calculated value of discharge current; and correcting the tentatively determined amount of peak-shift when the calculated value of the amount of heat generation and/or the calculated value of the amount of discharge are larger than the allowable amount of heat generation and/or the allowable amount of discharge, respectively, or when the calculated value of the amount of heat generation and/or the calculated value of the amount of discharge are largely less than the allowable amount of heat generation and/or the allowable amount of discharge, respectively. Further, it is preferable that the calculation of the amount of peak-shift comprises the steps of calculating said discharge current and said amount of discharge every time step during discharging said battery module and repeating the calculation until a discharge completion time determined by the tentatively determined amount of peak-shift elapses; and feeding back the calculated value of the amount of discharge to calculation of the discharge current. Furthermore, the calculation of the amount of peak-shift may comprise a step of functionally approximating the daily load characteristic of the electric power line or the load. Furthermore, the calculation of the amount of peak-shift may comprise a step of capturing the heat dissipation characteristic of the battery module and/or temperature dependence of than the discharge characteristic of the battery module.

Further, the method of operating the sodium-sulfur battery system in accordance with the present invention is characterized by that a value of discharge current of the battery module at each time point is calculated using the calculated result of the amount of peak-shift, and discharge of the battery module is controlled according to the amount of the discharge current, or that a reference electric power level is determined using the calculated result of the amount of peak-shift, and discharge of the battery module is controlled following to a load electric power exceeding the reference electric power level. In the case of the latter, the temperature of the sodium-sulfur battery or/and the amount of discharge of the battery module is measured, the measured temperature or/and the measured amount of discharge is compared with the allowable temperature of the sodium-sulfur battery or/and the allowable amount of discharge of the battery module, respectively, and discharge of the battery module is stopped when the measured temperature or/and the measured amount of discharge reaches the allowable temperature of the sodium-sulfur battery or/and the allowable amount of discharge, respectively, or when the measured temperature or/and the measured amount of discharge becomes larger than the allowable temperature of the sodium-sulfur battery or/and the allowable amount of discharge, respectively.

According to the present invention, since the appropriate amount of peak-shift is calculated within the range of the allowable temperature of the sodium-sulfur battery or/and the allowable amount of discharge of the battery module and the discharge of the battery module is controlled based on the appropriate amount of peak-shift, the peak-shift of the electric power line or the load can be performed without deteriorating the reliability of the battery module and with effectively using the electric energy stored in the sodium-sulfur battery. Further, since there is no need to unnecessarily increase heat dissipation from the battery module, the sodium-sulfur battery system can be kept in a high efficiency without using a large amount of energy in order to keep the temperature of the battery during charging and standing-by. Further, since the maximum output of the DC/AC converter unit is appropriately selected, the peak-shift of the electric power line or the load can be effectively performed without using additional equipment. As the result, it is possible to effectively perform the peak-shift and to provide the high reliable and high efficient electric power line system.

The allowable amount of heat generation in battery and the allowable amount of discharge of the battery module differ depending on structural design and required lifetime of the battery module. The former is determined by an allowable temperature of the battery which is determined by a heat capacity, an amount of heat dissipation and a required lifetime of the battery module. For example, in order to secure a lifetime of 15 years required by an electric power line, it is necessary to keep the temperature of the sodium-sulfur battery below 370° C., and accordingly the allowable amount of temperature rise becomes 50° C. providing that the maximum temperature of the sodium-sulfur battery during standing-by is 320° C. In a case where effect of heat dissipation is small, the allowable amount of heat generation in battery becomes the product of the allowable amount of temperature rise and the heat capacity of the battery module. On the other hand, an allowable amount of discharge is determined by an amount of active substances such as sodium and sulfur. Since an availability of the active substances in the structure of a general sodium-sulfur battery is 80 to 90%, the allowable amount of discharge can be determined from an amount in the unit of coulombs which is produced by electrochemical reaction of the amount of the active substance multiplied by the availability.

DESCRIPTION OF THE PREFERRED EMBODIMENTS

The present invention will be described below according to an embodiment.

Figure 1:
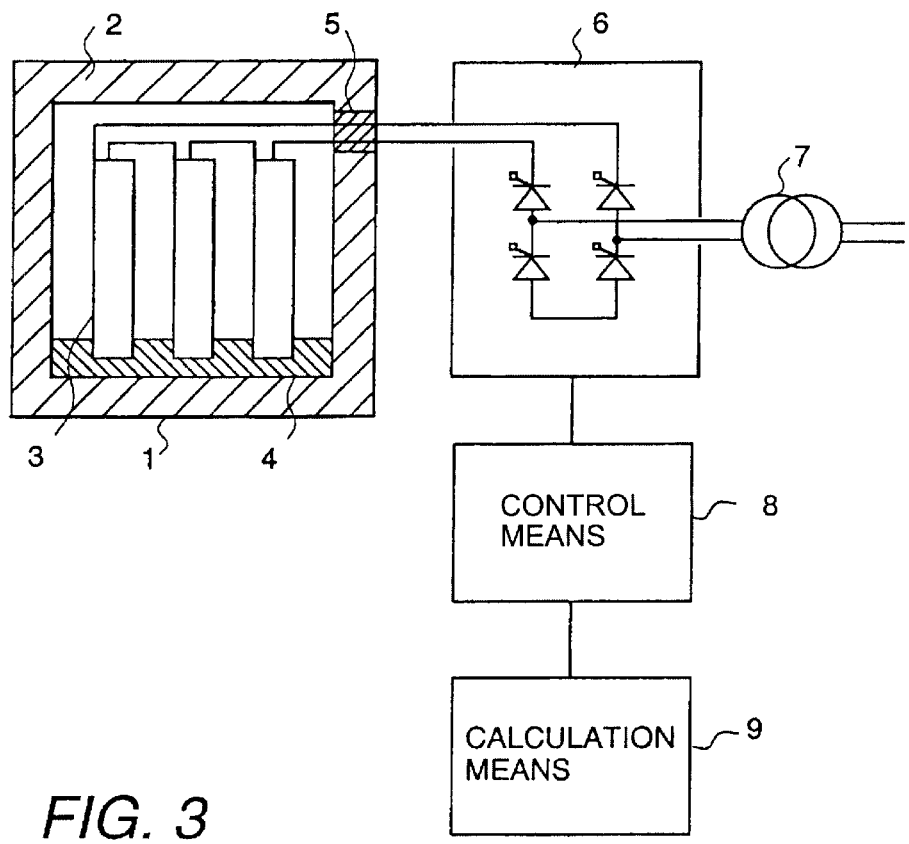
FIG. 1 is a block diagram showing an embodiment of a sodium-sulfur battery in accordance with the present invention.

FIG. 1 is a block diagram showing an embodiment of a sodium-sulfur battery in accordance with the present invention. In the figure, the reference character 1 is a battery module which has a plurality of sodium-sulfur batteries inside a thermal insulation container 2. A vacuum thermal insulation container is usually used as the thermal insulation container 2 because of good thermal insulation performance. A heater, not shown, is arranged in the thermal insulation container to heat up the batteries at starting operation, and during charging and standing-by. The reference characters 4, 5 are an insulation material and are used for electrically insulating the batteries and electric wires, respectively. The reference character 6 is an AC/DC converter unit which converts a DC power from the battery into an AC power to supply it to the electric power line or a load (discharge) and, on the other hand, converts an AC power from the electric power line or a generator into a DC power to supply it to the battery (charge). IGBTs (insulated gate bipolar transistors) are usually used for the semiconductor elements for the AC/DC converter unit. The reference character 7 is a transformer for electrical insulation and boosting, and the AC/DC converter unit 6 is connected to the electric power line, not shown, through the transformer 7. The reference character 8 identifies a control means such as a control unit which controls discharge of the battery module 1 using the AC/DC converter unit 6. Discharge is controlled based on an amount of peak-shift of the electric power line which can be performed by the battery module and is calculated by a calculation means 9 such as a computer. Further, the amount of peak-shift of the electric power line is calculated by the calculation means 9 using a daily load characteristic of load required by the electric power line or the load and the discharge characteristic of the battery module so that an amount of heat generation in battery and/or an amount of discharge of the battery module do not exceed an allowable amount of heat generation in battery and/or an allowable amount of discharge of the battery module, respectively.

According to this method, since discharge of the battery module is appropriately controlled so that the amount of heat generation in battery and/or the amount of discharge of the battery module are within the ranges of the allowable amount of heat generation in battery and/or the allowable amount of discharge of the battery module, respectively, it is possible to effectively perform the peak-shift of the electric power line without deteriorating the reliability of the sodium-sulfur battery. Further, since there is no need to unnecessarily increase heat dissipation from the battery module, the sodium-sulfur battery system can be kept in a high efficiency. Although discharge of the battery module is necessary to be controlled so that both of the amount of heat generation in battery and the amount of discharge of the battery module are within the ranges of the allowable values, the battery module can be designed so that if one of the amount of heat generation in battery and the amount of discharge is within the allowable range, the other automatically becomes an allowable value. In this case, either of the amount of heat generation in battery and the amount of discharge is calculated and then an amount of peak-shift of the electric power line may be determined so that the calculated result does not exceed the allowable value.

Figure 3:
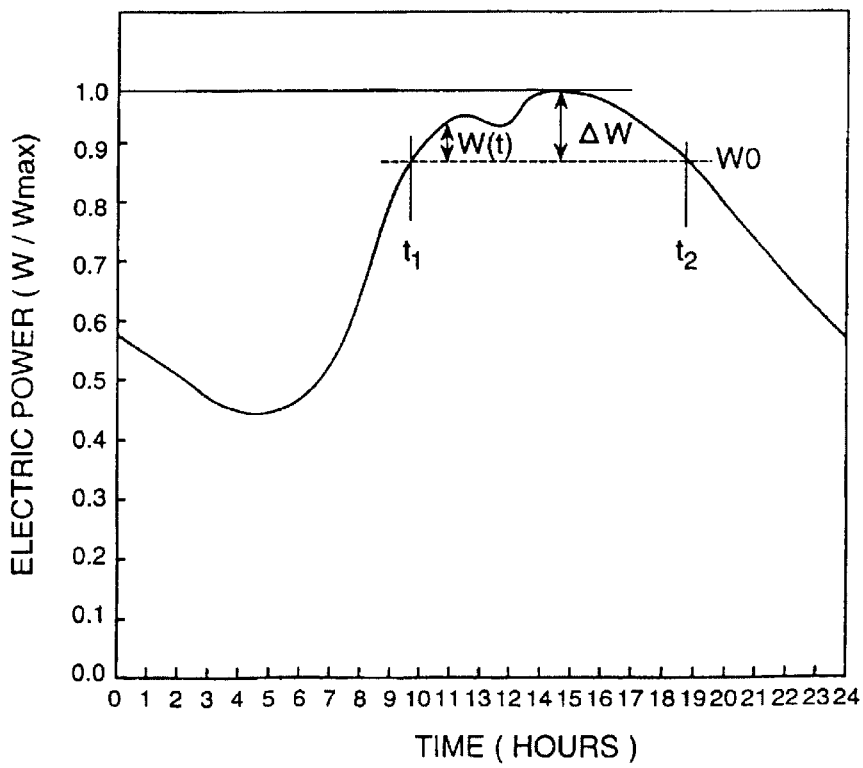
FIG. 3 is a pattern chart showing an example of daily load pattern of electric power.
Figure 2:
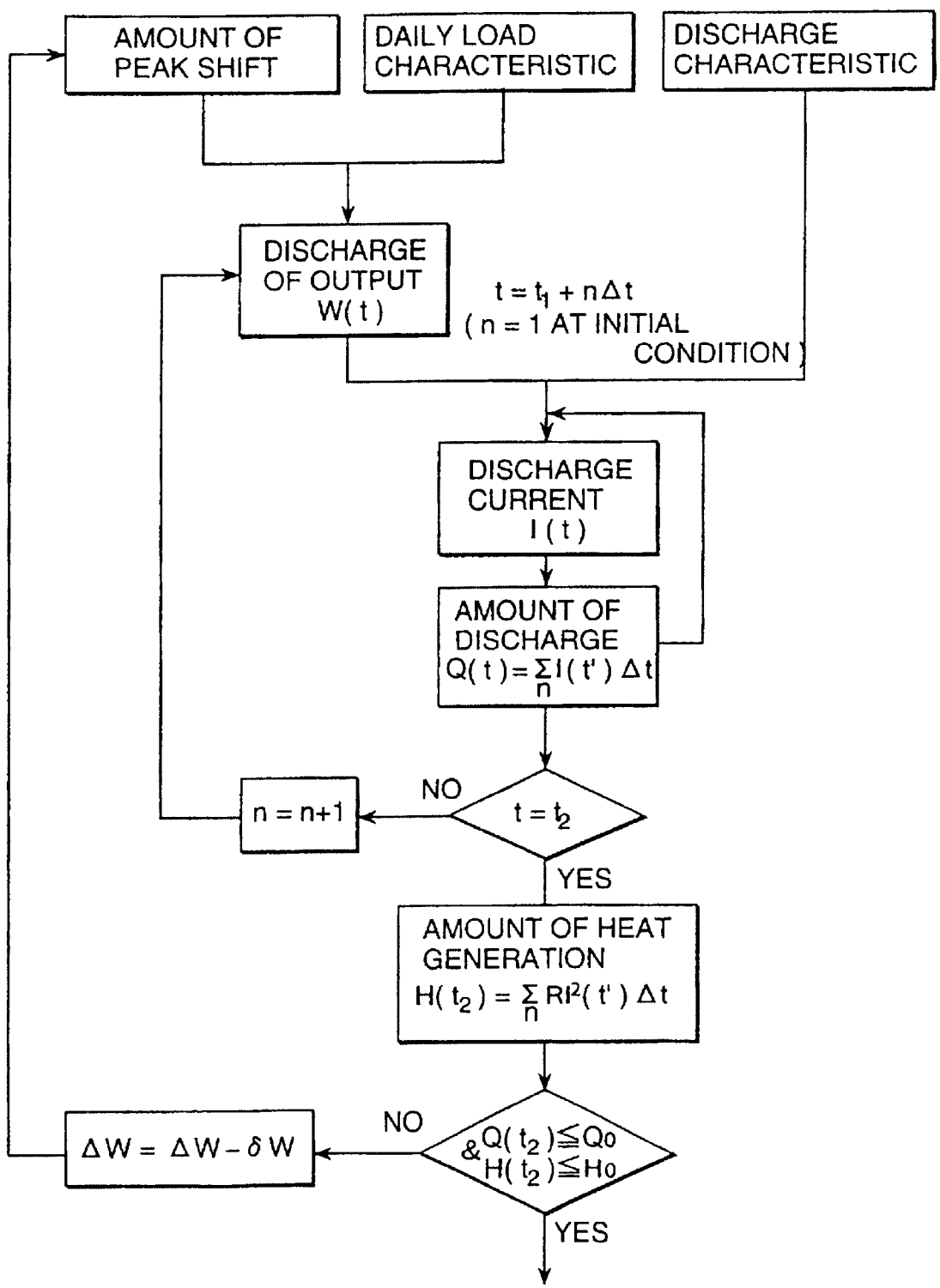
FIG. 2 is a flow chart showing an example of a calculation flow for discharge control of the sodium-sulfur battery system in accordance with the present invention.

FIG. 2 is a flow chart showing an example of a calculation flow for calculating an amount of peak-shift of the electric power line used in the sodium-sulfur battery system in accordance with the present invention. Initially, an amount of peak-shift AW is tentatively determined based on the daily load characteristic of the electric power line, as shown in the chart. FIG. 3 is a pattern chart showing an example of daily load pattern of electric power. It is assumed that peak-shift is performed by discharging from the battery module to supply an electric power which exceeds a reference electric power level $W_0$ expressed by a dashed line below the peak of the electric power by ΔW. The electric energy necessary for the discharge is supplied by charging during nighttime. Instead of using the daily load characteristic estimated based on a load pattern in the past, as shown in FIG. 3, the change of load electric power with time may be approximated using a trigonometric function, a triangular wave function or a trapezoidal shape function.

Next, discharge start timing $t_1$, discharge end timing $t_2$ and an amount of electric power W(t) at each time point are calculated from the daily load characteristic and the tentatively determined amount of peak-shift. Then, discharge current I(t) of the battery module at each time point is calculated from these values and the discharge characteristic of the matt3ery module using Equation 1.

$$W(t) = \eta \times [E_0 - I(t) \times R] \times I(t) \quad \text{(Equation 1)}$$

Therein, η is a conversion efficiency of the AC/DC converter unit from direct current to alternating current, $E_0$ is an electromotive force of the battery module, R is an internal resistance of the battery module. In an actual calculation, the time between the discharge start timing $t_1$ and the discharge end timing $t_2$ is divided into time steps having an interval $\Delta t$, and the discharge current in each time step is calculated by repeating the calculation in each step from the discharge start timing $t_1$ to the discharge end timing $t_2$.

Figure 4:
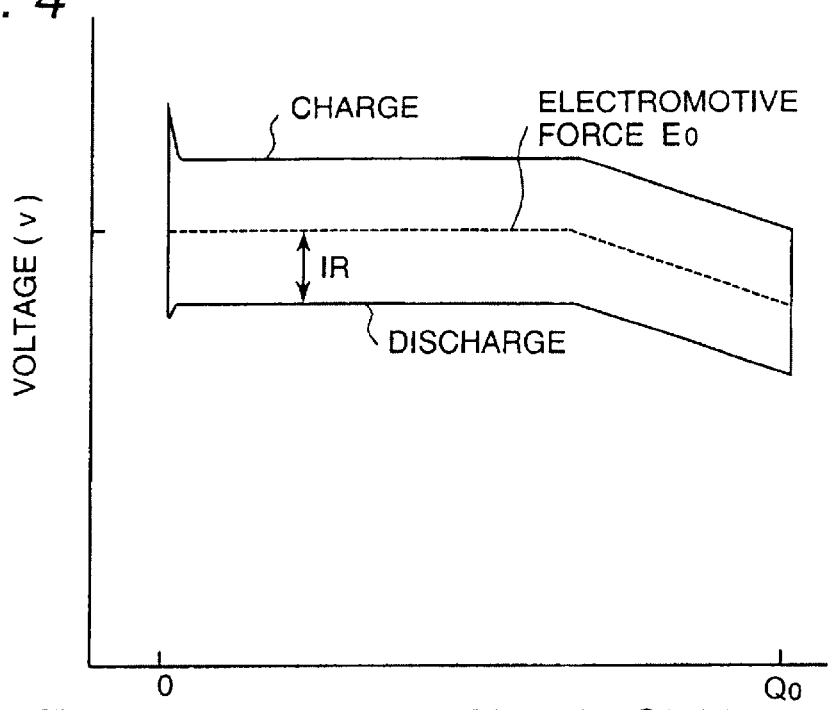
FIG. 4 is a graph showing the charge and discharge characteristic of a battery module.

FIG. 4 schematically shows the charge and discharge characteristics of a battery module. As shown in the graph, the discharge characteristic is obtained by subtracting the voltage drop IR caused by the internal resistance R from the electromotive force $E_0$. In a case where the sodium-sulfur battery is used for the battery module, the electromotive force E0 is varied depending on the amount of discharge Q, and the value of the internal resistance is not strictly constant but is also varied depending on the amount of discharge Q, as shown in FIG. 4. In that case, an amount of discharge at each time point Q(t) is calculated using Equation 2, and the electromotive force $E_0$ and the internal. resistance at each time point are calculated from the charge and discharge characteristics of the battery module shown in FIG. 4, and the discharge current I(t) is calculated by feeding back the values to Equation 1. By this method, the discharge current can be calculated with a high accuracy.

$$Q(t) = \sum_n I(t')\Delta t \quad \text{(Equation 2)}$$

Therein, $t'=t_1+n\Delta t$, $n=1\sim(t_2-t_1)/\Delta t$. Next, an amount of heat generation $H(t_2)$ in the battery module is calculated from Equation 3 using the calculated discharge current and the calculated internal resistance at each time step.

$$H(t_2)=\Sigma R \times I^2(t')\Delta t \quad \text{(Equation 3)}$$

Therein, $t'=t_1+n\Delta t$, $n=1\sim(t_2-t_1)/\Delta t$.

Finally, the amount of heat generation $H(t_2)$ calculated from Equation 3 and/or the amount of discharge $Q(t_2)$ calculated from Equation 2 are compared with the allowable amount of heat generation $H_0$ calculated from the heat capacity of the battery module and the allowable amount of temperature rise and/or the allowable amount of discharge $Q_0$ obtained from the amount of active substances of the battery module, respectively: If $H(t_2)>H_0$ or/and $Q(t_2)>Q_0$, it is judged that the discharge is too large. Then, the processing is returned to the beginning of the calculation, and the calculation is repeated by newly setting a reduced amount of peak-shift until the condition $H(t_2) \leq H_0$ and $Q(t_2)$ $Q_0$ is satisfied. If $H(t_2)$ and $Q(t_2)$ are excessively small compared to $H_0$ and $Q_0$, respectively, the amount of peak-shift is tried to be optimized within the ranges of the allowable amount of heat generation in battery and the allowable amount of discharge by recalculating with setting a little larger amount of peak-shift. By such a method, an appropriate amount of peak-shift $\Delta W$ can be determined, and consequently the discharge of the battery module can be appropriately controlled using the discharge current I(t) at each time point obtained based on the appropriate amount of peak-shift $\Delta W$. As the result, the peak-shift of the electric power line can be performed without deteriorating the reliability of the battery module and with effectively using the electric energy stored in the sodium-sulfur battery. There is no need to say that the electric energy stored in the battery module can be effectively used by controlling the discharge of the battery module so that the amount of peak-shift becomes as large as possible within the ranges of the allowable amount of heat generation in battery and the allowable amount of discharge.

In order to improve the calculation accuracy in the above-mentioned calculation, it is necessary to take the effects of the temperature rise due to heat generation of the battery module and the heat dissipation from the battery module into consideration. In detail, the electromotive force $E_0$ and the internal resistance R of the battery module are slightly reduced as the temperature is increased. Further, the temperature is slightly decreased due to heat dissipation from the battery module during discharge. By including these effects into the above-mentioned calculation, a highly accurate calculation can be attained. On the other hand, in a case where the calculation is performed with neglecting these effects, there is an advantage in that the calculation comparatively becomes simple. Further, because the obtained appropriate amount of peak-shift is a value smaller than that in the case where the effects are taken into consideration and accordingly the battery module is operated under a safety side, there is no problem to deteriorating the reliability of the sodium-sulfur batteries composing the battery module. Furthermore, according to this method, since the discharge control can be appropriately performed even if the heat dissipation during discharge is negligible small, the efficiency of the sodium-sulfur batteries can be kept high by reducing the heat dissipation from the battery module.

The calculation can be performed by approximating the daily load characteristic of FIG. 3 by a function. In this case, the appropriate amount of peak-shift can be directly calculated using Equation 1, Equation 2, Equation 3 and the values of the allowable amount of heat generation in battery and/or the allowable amount of discharge instead of using the calculation flow of FIG. 2. According to this method, there is an advantage in that the calculation time becomes shorter than that in the case of using the calculation flow of FIG. 2.

Figure 5:
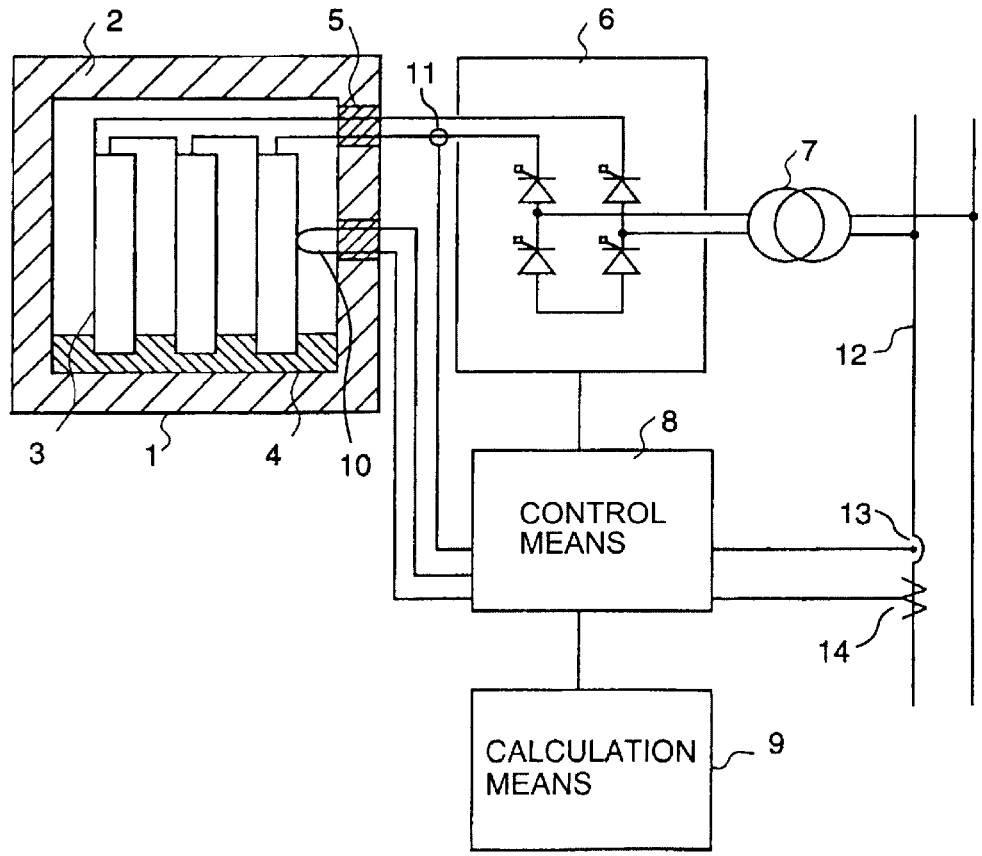
FIG. 5 is a block diagram showing another embodiment of a sodium-sulfur battery in accordance with the present invention.

Further, the discharge of the battery module can be controlled with following the actual load electric power exceeding the reference electric power level by calculating the reference electric power level $W_0$ (the value subtracting the amount of peak-shift from the peak of electric power) using the amount of peak-shift $\Delta W$ obtained from the above mentioned calculation as shown in FIG. 2. FIG. 5 shows the construction of an embodiment of a sodium-sulfur battery system in this case, and therein the like parts are identified by the same reference characters as in FIG. 1. Referring to the figure, the reference character 10 is a battery temperature measuring means such as a thermocouple, the reference character 11 is a discharge amount measuring means for the battery module, the reference character 12 is an electric power line for supplying electric power to a load, not shown, and the reference characters 13, 14 are load electric power measuring means such as PT and CT.

According to this method, there is an advantage in that the peak-shift can be highly accurately performed compared to the case where the discharge is controlled according to the calculated value of discharge current because the electric power actually required by the load is measured and the electric power is supplied from the battery module based on the actually required electric power. In the case of this method, when the actual load electric power is larger than the electric power to be required by the predicted daily load electric power shown in FIG. 3, it will be predicted that discharge is continued by violating the allowable amount of heat generation in battery and/or the allowable amount of discharge at a midpoint of the discharging, particularly, in the latter-half of the discharging. In such a case, the battery temperature during discharge is measured by attaching a temperature measuring means to the sodium-sulfur batteries composing the battery module, and the measured temperature is compared with the allowable battery temperature determined by the battery lifetime and so on, and the discharge may be controlled to be stopped if the measured temperature reaches or exceeds the allowable battery temperature. Further, in regard to the amount of discharge, a discharge amount measuring means such as a combination of a measuring apparatus and an accumulating apparatus for the discharge current is attached to the battery module, and the measured amount of discharge is compared with the allowable amount of discharge, and the discharge may be controlled to be stopped if the measured amount of discharge reaches or exceeds the allowable amount of discharge. By this method, the peak-shift can be effectively performed and the reliability of the sodium-sulfur battery can be kept high.

In addition, it is preferable that the maximum output of the AC/DC converter unit shown in FIG. 1 or FIG. 5 is equal to or larger than the amount of peak-shift of the electric power line, that is, $\Delta$ W of FIG. 2 which is determined using the daily load characteristic of the electric power to be required by the electric power line or the load and the discharge characteristic of the battery module so that the amount of heat generation in battery and/or the amount of discharge do not exceed the allowable amount of heat generation in battery and/or the allowable amount of discharge, respectively. If the maximum output of the AC/DC converter unit agrees with the value determined as the amount of peak-shift of the electric power line, there is an advantage in that the system has no useless additional capacity and can effectively perform the peak-shift. On the other hand, in the case where the maximum output of the AC/DC converter unit is larger than the value determined as the amount of peak-shift of the electric power line, the peak-shift of the electric power line can be effectively performed even if the actual load electric power is larger than the electric power required by the predicted daily load characteristic when the battery module is operated with following to the load electric power as shown in FIG. 5. Further, the amount of peak-shift is determined so that the amount of heat generation in battery is equal to or less than the allowable amount of heat generation in battery when the amount of peak-shift of the electric power line is determined, the discharge capacity of the battery module is designed with a margin for the allowable amount of discharge so that electric energy remains in the battery module at standing-by after completion of discharge. By doing so, this amount of electric energy can be used for an emergency electric power source.

As a detailed example, sodium-sulfur batteries each having a capacity of approximately 480 Wh and a rated output power of 60 W were used, and 216 units of the sodium-sulfur batteries were two-dimensionally arranged in a vacuum thermal insulation container of approximately 1 m width, approximately 1.5 m depth and approximately 0.6 m height to form a DC 100 kWh battery module having a structure similar to that shown in FIG. 1. Bus-bars made of aluminum were used as the electric terminals and were electrically insulated with glass wool to be led out of the insulation container. The vacuum thermal insulation container was used as the thermal insulation container. Further, a converter unit having a conversion efficiency of 95% and a maximum output power of AC 50 kw using IGBT elements was used as the AC/DC converter unit.

Using the sodium-sulfur battery system, discharge of the battery module was controlled based on the amount of peak-shift, the discharge start timing, the discharge end timing and the discharge current at each time point which were calculated according to the calculation flow shown by FIG. 2 on the daily load characteristic shown in FIG. 3. As the result, it was found that operation having discharging duration time of approximately 4 hours and peak output discharge power of AC 45 kW was performed, and accordingly the peak-shift of AC 45 kW could be performed. Further, the temperature of the sodium-sulfur battery at discharge start timing was 320° C. and the battery temperature at discharge end timing was 370° C., and accordingly the operation could be performed within the temperature range in which there was no problem on the reliability of the sodium-sulfur battery. Furthermore, the efficiency of the sodium-sulfur battery system was above 75%, and could stand comparison with the efficiency of the operating pattern of 8-hour constant power discharge, 8-hour constant current charge and 8-hour stand-by which was used in the general load flattening operation. Further, it was found that by using the sodium-sulfur battery system, peak-shift of an electric power line system could be effectively performed and the system efficiency could be improved.

According to the present invention, the peak-shift of an electric power line can be effectively performed without deteriorating the reliability of the sodium-sulfur battery, and the peak-shift of an electric power can be effectively performed using an AC/DC converter unit having no useless capacity. Further, the efficiencies of the sodium-sulfur battery system and an electric power line system. using the sodium-sulfur battery system can be kept high.

What is claimed is:

1. A sodium-sulfur battery system comprising:

a battery module having a sodium-sulfur battery contained in a thermal insulation container;

an AC/DC converter unit for converting direct current electric power obtained by said battery module into alternating current electric power;

a calculation means for calculating an amount of peak-shift of an electric power required by an electric power line or a load from a daily load characteristic of electric power required by said electric power line or said load and a discharge characteristic of said battery module and an allowable amount of heat generation in battery and/or an allowable amount of discharge of said battery module so that said heat generation and said discharge do not exceed said allowable amount of heat generation and/or said allowable amount of discharge respectively; and a control means for controlling discharge of said battery module from the amount of peak-shift obtained from said calculation means.

2. A sodium-sulfur battery system according to claim 1, wherein said calculation means comprises:

means for determining an amount of peak shift;

means for calculating a value of discharge current of said battery module using said daily load characteristic of electric power required by said electric power line and said load and said discharge characteristic of said battery module and said determined amount of peak shift;

means for comparing the value of said amount of heat generation in said battery and/or the value of said amount of discharge of said battery module which are calculated using said calculated value of discharge current with said allowable amount of heat generation in said battery and/or said allowable amount of discharge, respectively; and means for correcting said determined amount of peak-shift when said calculated value of said amount of heat generation in said battery and/or said calculated value of said amount of discharge are larger than or substantially {largely} less than said allowable amount of heat generation in said battery and/or said allowable amount of discharge, respectively.

3. A sodium-sulfur battery system according to claim 2, wherein said calculation means comprises:

means for feeding back said calculated value of said amount of discharge to said calculation of said discharge current.

4. A sodium-sulfur battery system according to claim 1, wherein said control means is means for controlling discharge of said battery module according to a value of said discharge current in each time point calculated from said amount of peak-shift.

5. A sodium-sulfur battery system according to claim 1, wherein said control means is for controlling discharge of said battery module in accordance with a load electric power exceeding a reference electric power level.

6. A sodium-sulfur battery system according to claim 5, wherein said calculation means comprises means for stopping discharge of said battery when said battery reaches an allowable temperature or becomes higher than an allowable temperature or when an amount of discharge of said battery module reaches an allowable amount of discharge or becomes larger than said allowable amount of discharge.

7. A sodium-sulfur battery system according to claim 1, wherein discharge of the battery is designed with a margin for said amount of discharge; and means for using an amount of electric power remaining in said battery module for an emergency electric power source.

8. A sodium-sulfur battery system according to claim 1, wherein said calculation means comprises means for stopping discharge of said battery when said battery reaches an allowable temperature or becomes higher than an allowable temperature or when an amount of discharge of said battery module reaches an allowable amount of discharge or becomes larger than said allowable amount of discharge.

* * * * *